Oct. 31, 1950   F. W. KRUEGER   2,527,885
CONTAINER CLOSING MACHINE
Filed Feb. 13, 1946   5 Sheets-Sheet 4
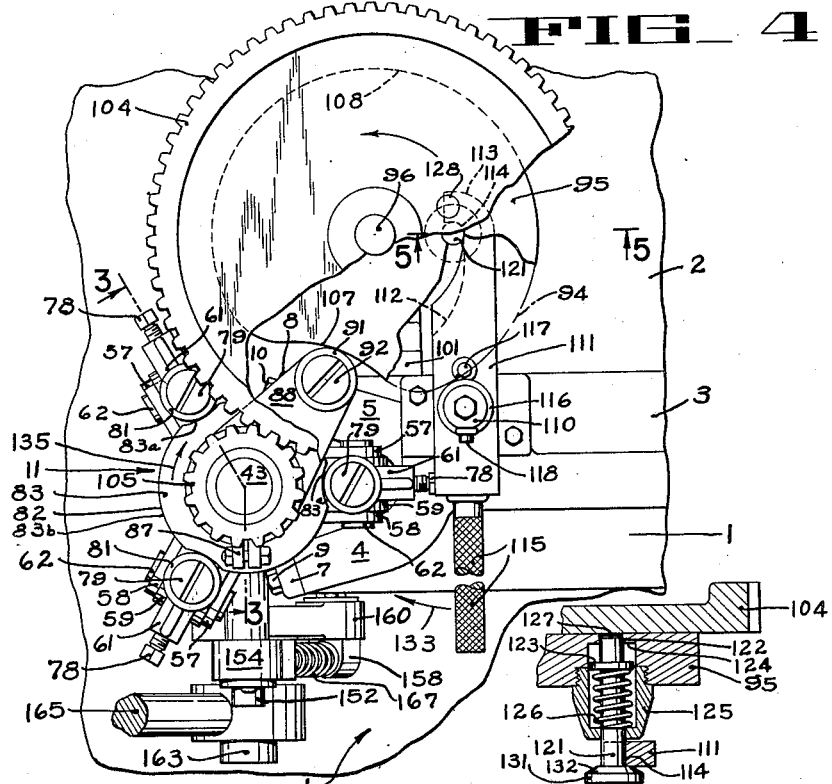
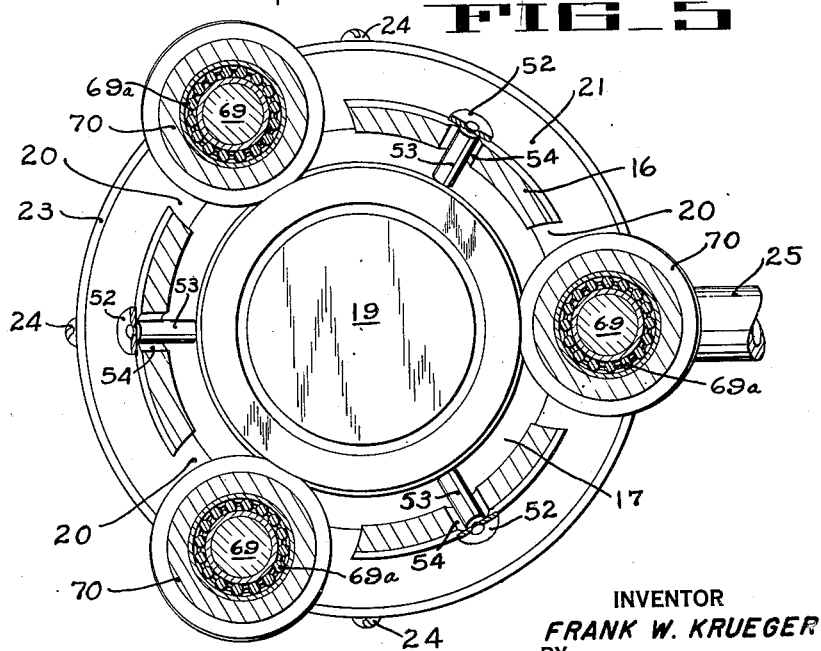
INVENTOR
FRANK W. KRUEGER.
BY Philip A. Minnis.
ATTORNEY

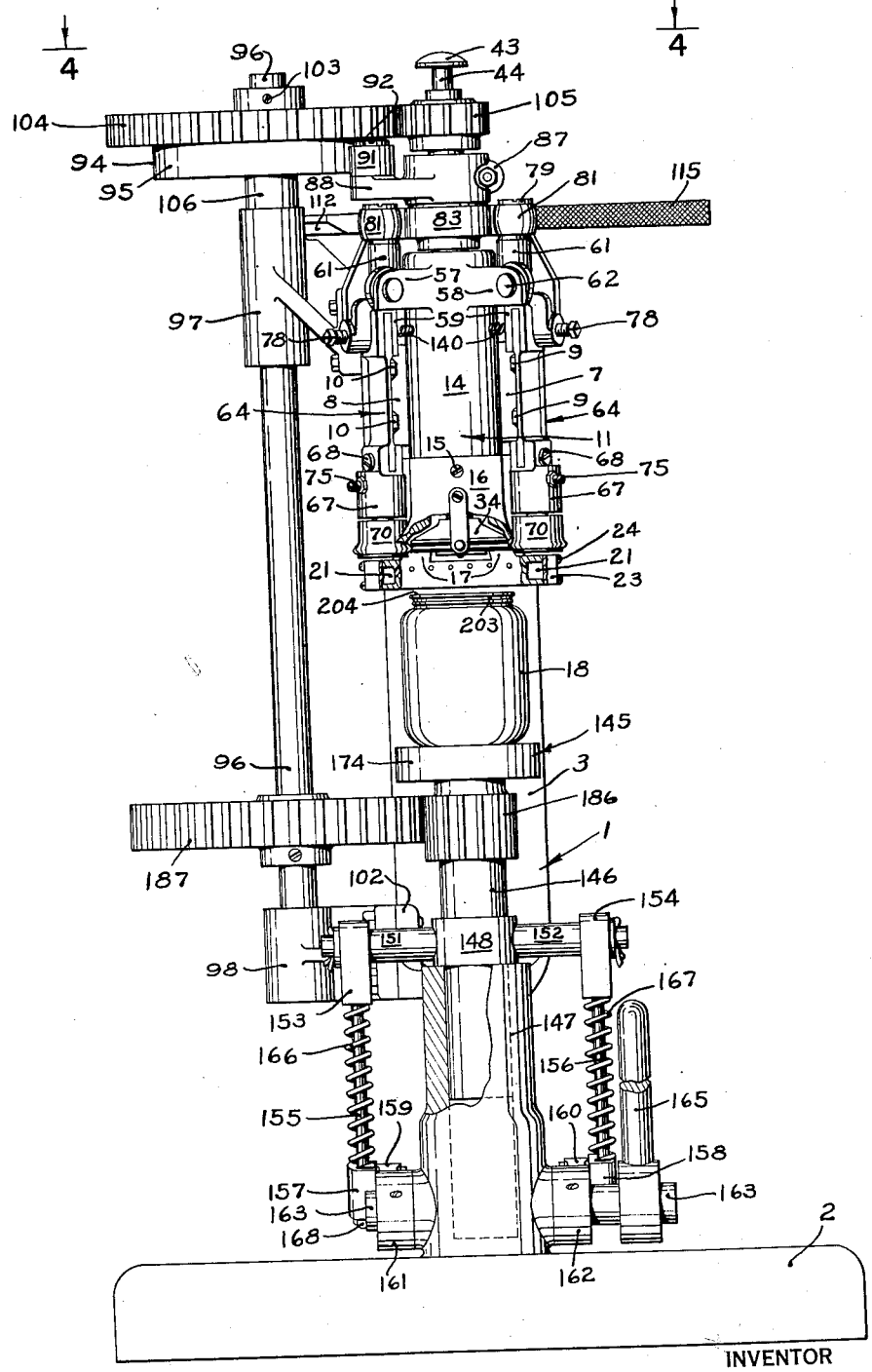
FIG_1

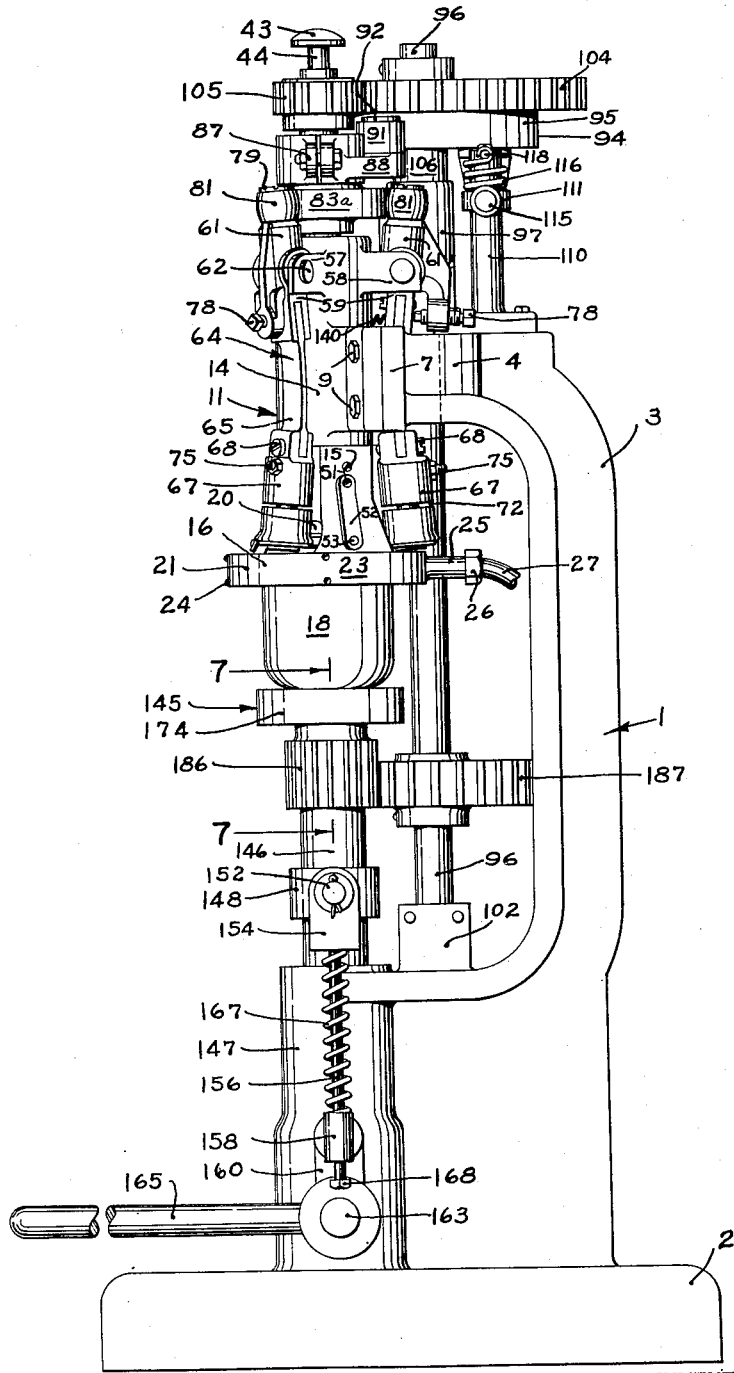
FIG_2

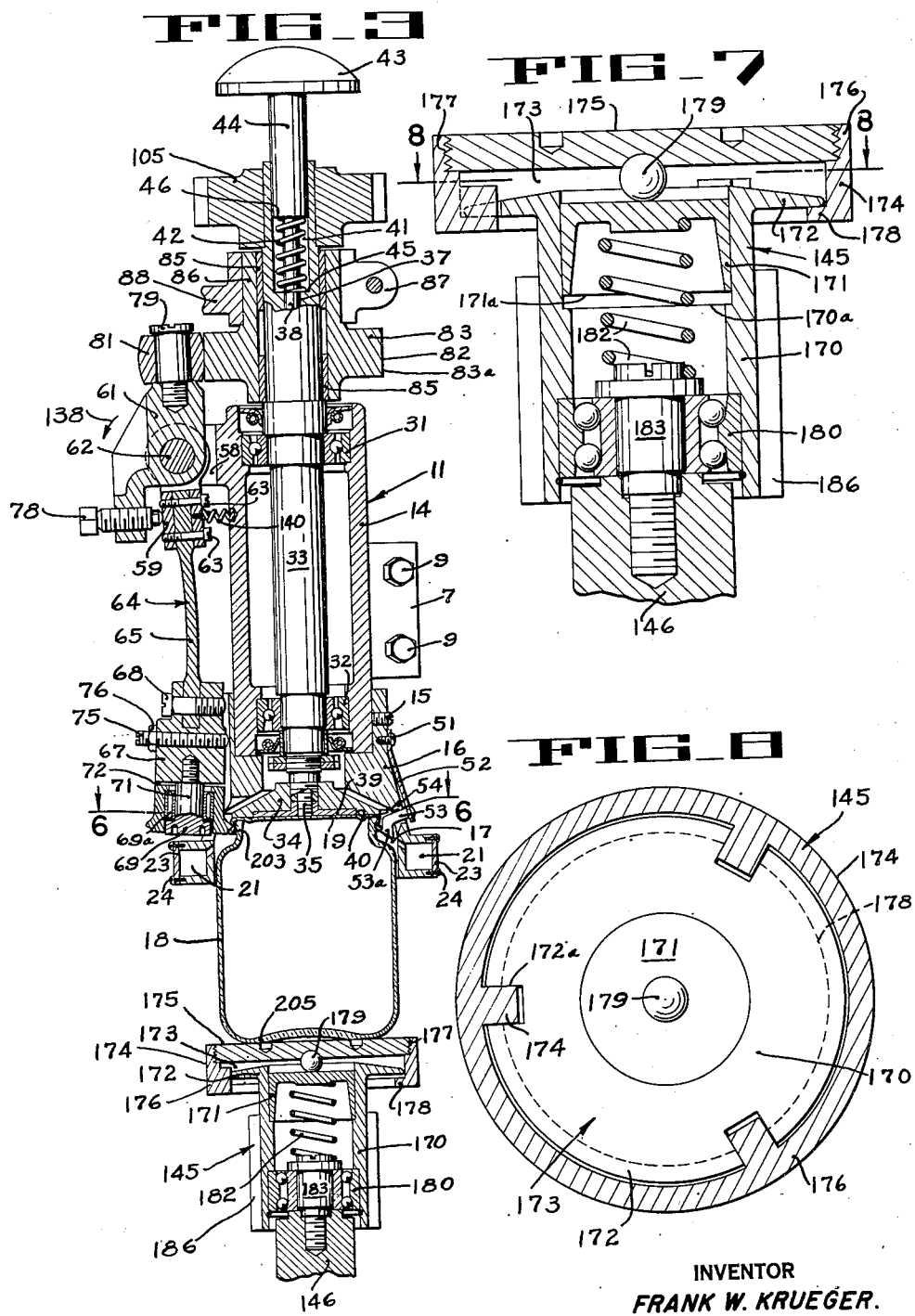

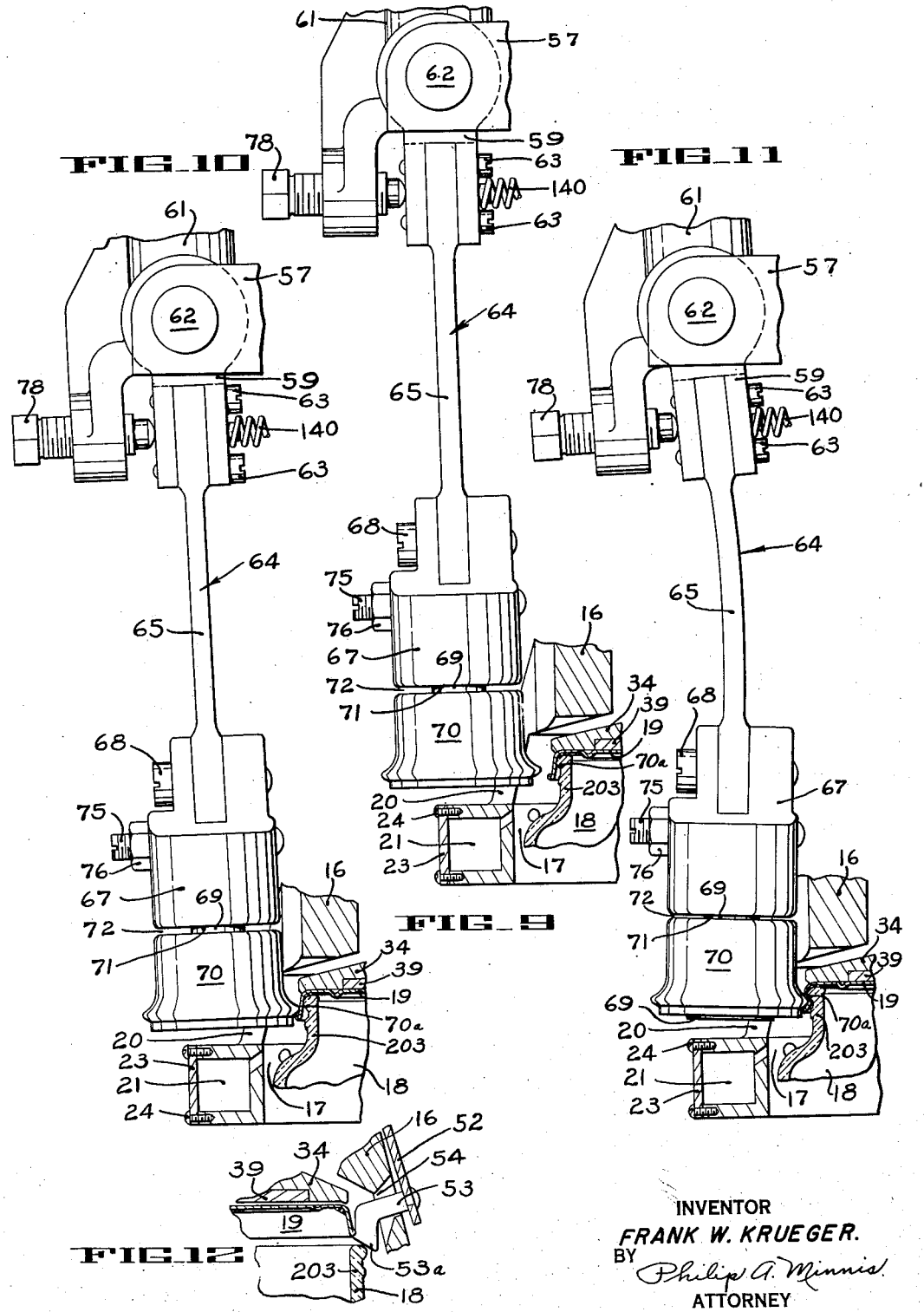

Patented Oct. 31, 1950

2,527,885

UNITED STATES PATENT OFFICE 2,527,885

CONTAINER CLOSING MACHINE

Frank W. Krueger, San Jose, Calif., assignor to Food Machinery and Chemical Corporation, San Jose, Calif., a corporation of Delaware Application February 13, 1946, Serial No. 647,363

11 Claims. (Cl. 226—87)

The present invention appertains to container closing machines for applying tin covers to containers and for hermetically sealing the same.

More particularly, the present invention relates to a seaming machine of the spinning type for applying tin caps to glass containers.

One object of the present invention is to provide a seaming machine for applying tin caps to glass containers into hermetic sealing engagement therewith and for spinning the caps onto the mouth rim of the containers into firm locking engagement therewith irrespective of any irregularities of the container.

Another object is to provide a seaming machine wherein the seaming rolls accommodate themselves to any irregularities and out-of-round conditions of the containers and establish their own plane of operation relative to the containers depending upon any irregularities thereof.

Another object is to provide a seaming machine wherein the seaming rolls effect a downward tucking action upon the skirt of the cap during spinning thereof onto the mouth rim of the container.

Another object is to provide a seaming machine for applying metal caps to containers wherein the mouth rim of the container is automatically positioned in a horizontal plane relative to the seaming rolls irrespective of any disalignment between the mouth rim and the bottom surface of the container.

Other and further objects and advantages of the present invention will become apparent from the following description and drawings in which:

Fig. 1 is a front view of the container closing machine of the present invention with the container supporting table thereof shown in its lowermost position and a glass jar positioned thereon.

Fig. 2 is a side view of the machine illustrated in Fig. 1; the container supporting table with a glass jar positioned thereon is shown in its uppermost position while the seaming rolls are illustrated in seaming position.

Fig. 3 is a vertical section through the seaming head of the machine, a portion of the supporting table and a container positioned thereon. The table and the container being illustrated in their uppermost position.

Fig. 4 is a plan view of Fig. 1, certain parts being broken away.

Fig. 5 is an enlarged section of a portion of Fig. 4 taken along line 5—5 thereof.

Fig. 6 is a section taken along line 6—6 of Fig. 3.

Fig. 7 is an enlarged vertical section of the glass jar supporting table; the parts thereof being shown in inoperative position.

Fig. 8 is a section of Fig. 7 taken along lines 8—8 thereof.

Figs. 9, 10, and 11 are elevational views of one seaming arm of the present invention and certain parts associated therewith illustrating the various steps of operation thereof; a portion of the sealing chamber, neck of the container, cap, and chuck being shown in section.

Fig. 12 is a detail view of a cap holding finger and certain parts associated therewith.

Referring now to the drawings, and especially to Figs. 1 to 4, inclusive, 1 indicates the frame structure of the machine which comprises a base 2 and an upright frame portion 3 provided with laterally extending arms 4 and 5. Secured to the laterally extending arms 4 and 5 by means of radially extending brackets 7 and 8 and cap screws 9 and 10 is a seaming head 11. This seaming head 11 comprises a tubular supporting member 14 of which the brackets 7 and 8, previously referred to, are integral parts. Attached to the lower end of the tubular supporting member by means of set screws 15 is a sealing head 16 having a sealing chamber 17 which is open at its lower end for the introduction of the neck portion of a glass jar 18 and a cap 19 to be applied thereto. The seaming head is provided at its periphery with a plurality of openings 20 equally spaced from each other.

Formed in the lower end of the sealing head 16 is an annular steam conduit 21 provided with a plurality of upwardly inclined steam outlets for admitting steam from the conduit 21 into the sealing chamber 17 and the glass jar or container in upwardly directed jets against the mouth rim of the container and the underside of the cap 19 when the container is disposed in steaming or vacuumizing position within the sealing chamber 17.

The outer peripheral wall 23 of the annular steam conduit 21 is made as a separate part and is secured to the steam conduit 21 by means of screws 24. A gasket or sealing compound is preferably disposed between the peripheral wall 23 and the remainder of the conduit 21 so as to establish a steam tight connection therewith. The steam conduit 21 is provided with a steam inlet pipe 25 which in turn is connected to a hose 26 from a source of steam supply by means of a hose coupling 27. Any appropriate control mechanism well known in the art may be provided for controlling the admittance of steam from the source of supply into the steam conduit 21 in timed relation with the operation of the machine.

Rotatably mounted within the tubular supporting member 14 by means of ball bearings 31 and 32 (Fig. 3) is a chuck operating shaft 33 to the lower end of which a chuck 34 is threadedly connected for rotation therewith, as shown at 35. Slidably disposed within a central bore 37 of the shaft 33 is a rod 38 to the lower end of which a circular ejector plate 39 is secured in any convenient manner. This ejector plate 39 is received within a circular recess 40 of the chuck 34 so that when the plate 39 is in retracted position its bottom face is flush with the bottom face of the chuck 34. The upper end of the central bore 37 of shaft 33 is of enlarged diameter, as shown at 41 and positioned therein is a coil spring 42 surrounding the upper end of the rod 38 to which an actuating knob 43 provided with a hub portion 44, slidably arranged within the enlarged bore portion 41, is secured. The spring 42 is disposed between the shoulder 45 of the shaft 33 and the lower end 46 of the hub 44 of the knob 43 so that the actuating knob 43 and the rod 38 are normally held in their uppermost position under the action of the spring 42 with the ejector plate 39 disposed within the recess 40 of the chuck 34, previously referred to.

Attached to the sealing head 16 by means of screws 51 (Figs. 3, 5, and 12) are a plurality of leaf springs 52 provided with fingers 53 extending through openings 54 in the sealing head into the sealing chamber 17 so as to engage and hold a cap presented thereto in said chamber prior to its application to the glass jar. Due to the resilient mounting of the fingers 53 and the inclined face 53a of these fingers, the same will swing slightly outward when a cap is inserted into the sealing chamber 17 so as to permit its introduction into the chamber with the upper surface of the cap spaced from the lower surface of the chuck while the fingers will engage the cap with sufficient pressure to hold the same in position.

The tubular supporting member 14 is further provided with a plurality of ears 57 and 58 arranged in cooperating pairs within each of which a seaming arm supporting yoke 59 and an actuating arm 61 are pivotally mounted by means of a pivot pin 62. Secured to each supporting yoke 59 by means of screws 63 is a seaming arm 64 which comprises a comparatively firm leaf spring 65 to the lower end of which a substantially cylindrical casting 67 is secured by means of screw 68. The leaf springs are calibrated for deflection at a predetermined pressure. Rotatably mounted on each casting 67 by means of a pivot pin 69 and roller bearing 69a is a seaming roll 70. These seaming rollers project through the openings 20 of the sealing head 16 into the sealing chamber 17. The portion 71 of the pivot pin 69 is of a greater length than the hub portion of the seaming roll 70 so that a play, as shown at 72, between the casting 67 and the seaming roll 70 is provided to permit vertical sliding movement of the seaming roll 70 and bearing 69a on the pivot pin 69 for purposes as will be more specifically explained later on.

Threadedly secured to each casting 67 and extending transversely therethrough is a set screw 75 provided with a lock nut 76. This set screw is adapted to contact the sealing head 16 and to limit the inward movement of each sealing arm. Each seaming roll 70 may be of any desired shape as required for the particular seaming operation of the machine and all three seaming rolls, one on each of the three seaming arms employed in connection with the present invention, may be either of the same shape or of different shape to perform the seaming operation in a simultaneous step or in successive steps.

The lower end of each actuating arm 61 is provided with a set screw 78 which engages the supporting yoke 59 of the seaming arm disposed adjacent thereto. Rotatably mounted on the upper end of each actuating arm 61 by means of a pivot pin 79 is a cam roller 81 which engages the periphery 82 of a rotary cam 83 mounted for free rotation of the shaft 33 by means of bushings 84 and 85. The cam 83 is provided with a plurality of declivities 83a and acclivities 83b.

Secured to the hub portion 86 of the rotary cam 83 by means of a clamp 87 is a cam actuating arm 88 (Figs. 3 and 4). This clamp portion 87 forms an integral part of the arm 88. The free end of the arm 88 is provided with a roller 91 rotatably secured thereto by means of a pivot pin 92 and adapted to engage the periphery 94 of a rotary cam 95, which is disposed for free rotation on a vertical shaft 96. The shaft 96 is rotatably mounted within a bearing 97 and an end thrust bearing 98 of laterally extending arms 101 and 102, respectively, forming integral parts of the upright frame portion 3, previously referred to. Fixed to the shaft 96 for rotation therewith by means of a set screw 103 is a gear 104 which intermeshes with a gear 105 keyed to the upper end of the shaft 33 whereby upon rotation of the gear 104, rotation of the shafts 96 and 33 is effected. The rotary cam 95 is provided with a hub portion 106 which bears against the upper surface of the bearing 97 so that the cam 95 is held in proper position relative to the roller 91. The peripheral cam surface 94 of cam 95 is provided with a declivity 107 and an acclivity 108.

Pivotally mounted on a stud 110 (Figs. 2 and 4) secured to the upper end of the upright frame portion 3 is a cam control arm 111 provided with an inclined camming surface 112 and a hooked end 113 forming a pin receiving recess 114. The other end of the cam control arm 111 is provided with a control handle 115 while a torsion spring 116 surrounds the upper end of the stud 110. One end of the spring 116 is secured at 117 to the arm 111, while the other end of said spring is secured at 118 to the upper end of the stud 110 so that the hooked end of the arm 111 is normally forced inwardly toward the bearing 97 and will either bear against this bearing or engage a cam control pin 121 (Figs. 4 and 5) and receive the same within the recess 114.

This cam control pin 121 (Fig. 5) is slidably mounted within a bore 122 of the rotary cam 95 and is provided with an annular shoulder 123 adapted to engage a shoulder 124 of the cam 95 within the bore 122. Surrounding the pin 121 and interposed between the shoulder 123 thereof and a spring retaining plug 125 is a coil spring 126 normally urging the pin 121 upwardly with its shoulder 123 into engagement with the shoulder 124 of the cam 95 so that the upper end 127 of the pin 121 will bear against the lower surface of the gear 104 and snap into an opening 128 therein when the same is brought into alignment with the pin 121 during the rotation of the gear 104 whereby the cam 95 is connected with the gear 104 for rotation therewith.

The lower end of the control pin 121 extends into the path of movement of the control arm 111 and is provided with a head 131 having an annular upwardly inclined surface 132 adapted to engage the camming surface 112 of the arm 111 during the rotation of the gear 104, rotary cam 95, and control pin 121. The resulting camming action between the camming surfaces 112 and 132 shifts the control pin 121 downwardly out of engagement with the gear 104, i. e., retracts the pin 121 into the cam 95, to thereby interrupt the driving connection established by the pin 121 between the cam 95 and gear 104. As soon as the pin is disengaged from its driving connection with the gear 104, the pin 121 is received within the recess 114 of the control arm 111 and is held therein so that further rotation of the pin 121 and the cam 95 is immediately arrested.

The driving connection between the gear 104 and cam 95 is re-established when the arm 111 is swung by the operator in the direction of arrow 133 (Fig. 4) against the action of the torsion spring 116 whereby the pin 121 is released for upward movement under the action of the spring 126. As soon as the pin 121 has entered the opening 128 of gear 104 the operator releases the arm and the same swings inwardly with its hooked end 113 into contact with the bearing 97 under the action of the torsion spring 116. While the arm 111 is now in its innermost position in the path of travel of the pin 121, the cam 95 and control pin 121 perform one complete revolution with the gear 104. At the end of this revolution the inclined surface 132 of the pin 121 is engaged by the camming surface 112 of the arm 111 and the pin is retracted, i. e., shifted out of engagement with the gear 104 whereby further rotation of the cam 95 is arrested as the pin is received within the recess 114 of the arm 111, as above described.

While the rotary cam 95 is rotated one revolution, as above described, the roller 91 leaves the declivity 107 of the peripheral cam surface 94 of the cam 95 and rides along the acclivity 108 thereof, whereby the arm 88 is swung and cam 83 is turned in the direction of arrow 135 (Fig. 4). Upon turning of the cam 83 the acclivities 83b thereof are presented to the rolls 81 of the actuating arms 61, whereby the rolls are forced outwardly and the arms 61 are swung in the direction of arrow 138 (Fig. 3). This movement of the actuating arms 61 forces the set screw 78 thereof against the supporting yokes 59 of the seaming arms 64 and causes inward movement thereof from their position, as shown in Fig. 9, to the position shown in Fig. 10, and finally to the position illustrated in Fig. 11 so that the seaming rolls 70 are forced against the skirt portion of the cap (Fig. 9) and the same in turn is forced against the neck portion of the glass jar, as shown in Fig. 11 when a glass jar is in position within the seaming head 11. A successive operation of these rolls may be obtained by arranging the acclivities 83b of cam 83 accordingly. Since the inward movement of the supporting yokes 59, effected by the actuating arms 61, is greater than the permissible inward movement of the seaming rolls 70, the leaf springs 65 are bent and are placed under tension (Fig. 10) so that the seaming rolls are continuously held under pressure against the skirt portion of the cap and continuously force the same against the neck portion of the jar but are free to yield relative thereto for purposes as will be explained more specifically later on.

It should further be noted that the ears 57 and 58, pivot pins 62, actuating arms 61, and set screws 78 are so located relative to each other and the sealing head and the length of the leaf spring 65 is such that an inward tilting of the upper end of the casting 67 and a corresponding tilting of the seaming rolls 70 is effected. This causes a slight downward swing of the seaming rolls during their inward movement as they force the skirt portion of the cap against the neck portion of the jar in the spinning operation, so that a downward tucking action is exerted by the rolls against the skirt portion of the cap spinning the same firmly under the bead 70a at the mouth rim of the jar. In this way a tight seal between the cap and jar is established and any bulging of the cap adjacent the sealing surface of the jar is prevented.

While the seaming action takes place, each seaming roll, due to the vertical play thereof on the pivot pin 71, can establish its own plane of travel depending upon irregularities of the neck portion of the jar. Furthermore, due to the length of the leaf springs 65, each seaming roll can float inward or outward under or against the action of the leaf spring associated therewith without noticeable variation in seaming pressure so that each roll can follow any out-of-round condition or other irregularities of the glass jar during the seaming operation. Consequently, irregularities of the glass jar, variations in tolerance thereof, etc., do not affect the seaming operation or cause improper sealing of the cap to the container.

As soon as one complete revolution of the rotary cam 95 has been completed, the roller 91 returns into the declivity 107, the rotary cam 83 returns to its original position with the declivities 83a thereof adjacent the rollers 81 of the actuating arm 61, the arms 61 are released and the seaming arms 64 are returned to their original positions under the action of the leaf springs 65 and coil springs 140 interposed between the tubular member 14 and the yokes 59.

The glass containers to be closed by the machine of the present invention are supported upon a table structure 145 rotatably mounted on a supporting column 146 slidably positioned within a socket 147 forming an integral part of the frame structure 1 intermediate the base 2 and upright portion 3 thereof. Normally when the table is in its lowermost position, the shoulder 148 of the supporting column 146 rests against the top surface of the socket 147 (Fig. 1).

Secured to the supporting column 146 are horizontally extending studs 151 and 152 on which blocks 153 and 154 are pivotally mounted. Fixed to the lower ends of the blocks 153 and 154 are rods 155 and 156, respectively, which slidably extend through blocks 157 and 158 pivotally secured to the free ends of actuating arms 159 and 160, respectively, the other ends 161 and 162 of which are fixed to a shaft 163 rotatably mounted within the bottom portion of the socket 147. Keyed to the free end of the shaft 163 is an actuating arm or foot pedal 165. Surrounding the rods 155 and 156 and interposed between the blocks 153 and 157 and 154 and 158, respectively, are coil springs 166 and 167. While threadedly secured to the free end of each rod 155 and 156 is a nut 168.

Rotatably mounted on the supporting column 146 is the table structure 145, previously referred to, which comprises a cylindrical member 170 (Figs. 3 and 7) within which a piston 171 is slidably mounted. The upper end of the cylindrical member 170 is provided with an annular flange 172 received within a circular recess 173 of the table 174 and provided with radial slots 172a. The table 174 comprises a table surface 175 and a table rim 176 threadedly secured together, as shown at 177. The table rim 176 is provided with a flange 178 which prevents removal of the table 174 from the flange 172 of the member 170, while projections 174a extending into the slots 172a establish a driving connection between the table 174 and the sleeve 170. Interposed between the piston 171 and the table surface 175 is a ball 179, while interposed between the piston 171 and a vertical bearing 180 is a coil spring 182. The cylindrical member 170 is rotatably supported on the upper end of the supporting column 147 by means of the ball bearing 180 secured thereto by a screw 183. The coil spring 182 normally forces the piston 171, ball 179, and table 174 upwardly so that the flange 178 of the table rim engages the flange 172 of the cylindrical member 170 (Fig. 7) whereby the table is held in a horizontal position. Formed in the outer periphery of the cylindrical member 170 is an elongated gear 186 which intermeshes with a gear 187 secured to shaft 96 for rotation therewith (Fig. 1).

When the foot pedal 165 is in its uppermost position, as shown in Fig. 1, the table is disposed in its lowermost position, as shown in said figure. To effect raising of the table 174 to thereby introduce the neck portion of a container placed thereon into the seaming chamber 17 and into firm contact with a cap 19 inserted therein, the foot pedal 165 is swung downward into the position, shown in Fig. 2, whereby the arms 159 and 160 are disposed in a vertical position and the springs 166 and 167 force the blocks 153, 154 and studs 151, 152, supporting column 146, and table 174 upward until the mouth rim of the glass jar positioned thereon enters the seaming head 11 and finally contacts the cap within the sealing chamber and forces the same against the arbor 34 so that further upward movement of the glass jar and the table 174 is arrested. This depresses the table against the tension of the coil spring 182 until the lower edge 171a of the piston 171 contacts the annular shoulder 179a of the sleeve 170, so that the flange 178 is disengaged from the flange 172 and the table is free to tilt and align itself with the bottom surface of the jar. The remaining tension of the springs 166 and 167, however, holds the container and cap 19 in firm gripping engagement between the table 174 and chuck 34 so that upon rotation of the table and chuck the glass jar and cap are rotated as a unit therewith.

In the operation of the machine while the table 174 thereof is in its lowermost position and the seaming rolls are in their outermost or nonseaming position, a cap 19 is introduced into the sealing chamber into engagement with the cap holding fingers 53 which hold the same firmly in position within the sealing chamber with the top surface of the cap adjacent but out of contact with the continuously rotating chuck 34. The cap may be manually inserted by the operator or any appropriate automatic cap feeding mechanism may be employed.

A glass jar 18 is manually placed upon the continuously rotating table 174 or may be automatically fed thereto by an automatic container feeding mechanism. Thereupon the foot pedal 156 is swung from its position in Fig. 1 to its position shown in Fig. 2 whereby the table is raised in a manner as specifically described previously herein. During this upward movement of the table 174, the neck portion 203 of the glass jar 18 is introduced into the sealing chamber 17 and is centered relative to the cap 19 by the inclined faces 53a of the cap holding fingers 53 (Fig. 12). While the glass jar is elevated in this manner and before the sealing surface 204 thereof contacts the sealing ring or sealing compound of the cap 19 steam is admitted into the annular steam conduit 21 through hose 26 and inlet pipe 25 from a source of steam supply (not shown). The admittance of the steam may be manually or automatically controlled in any conventional manner.

The steam entering the conduit 21 is discharged therefrom in upwardly inclined jets past the sealing surface 204 of the jar 18 into the open mouth of the same and against the lower surface of the cap 19. While this steaming action, well known in the art, takes place, the upward movement of the glass jar 18 continues until the sealing surface 204 of the jar engages the sealing ring of the cap 19 and lifts the cap into contact with the chuck 34. Further upward movement of the jar forces the sealing surface 204 into firm sealing engagement with the sealing ring of the cap while the cap is firmly held against further upward movement by the chuck 34. The supply of steam to the steam conduit 21 is continued until the seaming operation hereinafter described is completed and while the glass jar and cap are firmly held between the table 174 and chuck 34 under the action of the coil springs 166 and 167, as previously described, and are rotated as a unit with the table and chuck.

As soon as the cap 19 contacts the chuck 34, the table 174 is depressed against the tension of the coil spring 182 and is free to tilt. Therefore, if the sealing surface 204 of the jar 18 is not parallel to the bottom surface 205 of the jar, the table 174 will tilt accordingly and will automatically compensate for such condition. In other words, any non-parallel disposition of the sealing surface 204 with respect to the bottom surface 205 of the jar and vice-versa will be compensated for by a corresponding tilting of the table 174 in the manner as specifically referred to previously herein so that under any such condition the sealing surface 204 and the cap are brought into sealing engagement with each other and are disposed parallel to the chuck 34, as clearly shown in Fig. 3.

While the jar and cap are now firmly held between the table 174 and chuck 34 and are rotated as a unit therewith the operator swings the control handle 115 in the direction of arrow 133 whereby the cam control pin 121 is released and the cam 95 is connected to the gear 104 for rotation therewith. After the control pin is released, the operator releases the control handle 115 so that the control arm is swung into the path of the control pin 121 under the action of spring 116 and disengages the pin from its driving connection with the gear 104 as soon as the cam 95 has completed one complete revolution in the manner as described previously herein.

During this one complete revolution of cam 95 and while the jar and cap are continuously rotated by the table 174 and chuck 34, the seaming arms are swung into seaming position, that is from their position shown in Fig. 9 to the position shown in Fig. 10, and finally to the position illustrated in Fig. 11, and spin the skirt portion of the cap over the bead 70a of the jar onto the neck portion of the jar and into locking engagement therewith.

During this spinning operation, the seaming rolls establish their own plane of travel relative to the neck portion of the jar in view of their vertical play on the pivot pins 69 and yield inwardly and outwardly under or against the spring action of the seaming arms 64 with which they are associated. The length of these spring arms is such that substantially the same pressure is exerted by the rolls against the cap irrespective of any slight inward or outward floating action of the rolls as the same follow any irregularities or out-of-round conditions of the neck portion of the jar.

Due to the inward tilting of the upper ends of the seaming rolls as the spring arms are bent and spring loaded during their inward movement from the position shown in Fig. 10 to the position illlustrated in Fig. 11 a downward tucking action of the seaming rolls is obtained which pushes the skirt portion of the cap downwardly during the spinning operation. This downward tucking action pulls the top panel of the cap tightly against the sealing surface of the jar and thereby effects a perfect hermetical seal between the sealing ring of the cap and the sealing surface of the jar irrespective of any waviness of or dips in the sealing surface of the glass jar.

During this spinning operation while the cam 95 performs one revolution, the glass jar and cap are rotated numerous times and at a higher speed than the gear 104 in view of the speed change obtained by the small gear 105 intermeshing with the large gear 104 so that a perfect spinning application of the cap to the neck portion of the glass jar is obtained before the rotation of the cam 95 is arrested. The ratio between the gears 104 and 105 may be changed as desired so as to increase or reduce the number of revolutions required for the spinning operation. Upon completion of the rotation of the cam 95 the seaming pressure against the seaming arms is released and the same swing out of engagement with the cap under action of the spring arms 65 and coil springs 140 to their original position, as shown in Fig. 9. The steam supply to the conduit 21 is now shut off.

Thereupon, the table 174 is lowered and at the same time the button 43 is depressed whereby the sealed jar is ejected from the sealing head out of holding engagement with the spring fingers 53 and may now be removed when the table arrives in its lowermost position, as shown in Fig. 1.

While the table is lowered the same assumes and is locked in its original horizontal position due to the engagement of the flange 172 by the flange 178 under the action of the spring 182, as shown in Fig. 7.

It will be further noted that the seaming pressure of the seaming arms may be varied as desired by adjustment of the set screws 78. The set screws 75 are so adjusted at all times as to prevent contact of the seaming rolls with the sealing head when the machine is operated empty.

While I have shown a stationary single head container closing machine for the purpose of illustrating the present invention, it should be understood, however, that this seaming head and the table associated therewith may be used in connection with a continuous rotary seaming machine and in such case the continuous seaming machine may be provided with a plurality of such seaming heads in a manner as well known in the art. In such case all of the manually performed operations referred to herein may be automatically performed.

It is further to be understood that while a continuously rotating table and chuck have been illustrated in the present disclosure, both of these units may be intermittently operated in such a manner that the table and chuck are at rest when a container and cap are presented thereto and may be rotated only during the actual spinning operation.

While I have described a particular embodiment of the present invention, it will be understood that various changes and modifications may be made without departing from the spirit of the present invention and the scope of the appended claims.

Having thus described my invention, what I claim to be new and desire to protect by Letters Patent is:

1. A machine for spinning metal caps to glass jars comprising means for holding a jar with a cap positioned thereon in sealing engagement therewith, means for rotating said holding means, jar and cap as a unit, a freely rotatable and axially tiltable seaming roll adjacent the skirt of the cap, and means for yieldingly urging the seaming roll against the skirt of the cap while gradually tilting the axis of the roll into downwardly and outwardly inclined relation with respect to the skirt of the cap to thereby spin the same to the jar with a downward tucking action during the rotation of said jar and cap.

2. A machine for spinning tin caps to glass jars comprising means for holding a jar with a cap positioned on the neck portion thereof and in firm engagement with the sealing surface of the jar, means for rotating said holding means, jar and cap as a unit, a freely rotatable and axially tiltable seaming roll adjacent the skirt of the cap, and means for urging said roll under predetermined pressure against the skirt of the cap while gradually tilting the axis of the roll into downwardly and outwardly inclined position relative thereto to thereby spin the skirt of the cap to the neck portion of the jar with a downwardly directed tucking action during the rotation of the jar and cap.

3. A machine for spinning tin caps to glass jars comprising means for holding a jar with a cap positioned on the neck portion thereof and in firm engagement with the sealing surface of the jar, means for rotating said holding means, jar and cap as a unit, a seaming roll, means rotatably supporting said roll for free vertical movement relative to the skirt of the cap, and means for urging said roll under predetermined pressure and in downwardly and outwardly inclined position against the skirt of the cap to thereby spin the same to the neck portion of the jar with a downward tucking action during the rotation of the jar and cap while the roll is free to establish its own vertical position relative to the skirt of the cap.

4. A machine for spinning metal caps to glass jars comprising a sealing head having a sealing chamber, a rotatable chuck in said chamber, means for holding a cap in said chamber adjacent said chuck, a rotatable table for receiving and supporting a glass jar to be closed, means for elevating said table for introducing the neck portion of the glass jar into said sealing chamber into contact with said cap and for pressing said cap into contact with said chuck, means for rotating said table, jar, cap and chuck as a unit, a seaming roll, means rotatably supporting said roll for free vertical movement relative to the skirt of the cap, and means for urging said roll under predetermined pressure against the skirt of the cap and with the axis of the roll disposed in downwardly and outwardly inclined position relative thereto to thereby spin the skirt of the cap to the neck portion of the jar with a downward tucking action during the rotation of the jar and cap while the roll is free to establish its own vertical position relative to the skirt of the cap.

5. A container closing machine comprising a rotatable table for supporting a container having a cap loosely placed thereon, a freely rotatable chuck above said table, means for raising said table and the container supported thereby to bring said cap into firm engagement with said chuck, means for rotating said table, container, cap and chuck as a unit, a plurality of freely rotatable seaming rolls adjacent said chuck, means for yieldingly supporting said rolls for inward and vertical movement relative to said cap, and means for operating said supporting means to yieldingly force said rolls under predetermined pressure against the skirt portion of the cap and to tilt the rolls outwardly and downwardly relative thereto whereby the skirt of the cap is spun onto the neck portion of the container with a downward tucking action exerted upon the skirt of the cap by said rolls during such spinning operation while the seaming rolls are free to vertically and horizontally yield independently of each other in following any irregularities of the neck portion of the container.

6. A machine for spinning tin caps to glass jars comprising a rotatable chuck, means for holding a cap adjacent said chuck, a rotatable table for receiving and supporting a glass jar to be closed, means for elevating said table for presenting the glass jar to said cap and for pressing said cap into contact with said chuck, means for rotating said table, jar, cap and chuck as a unit, a seaming roll, means rotatably supporting said roll for free vertical movement relative to the skirt of the cap, means for urging said roll under predetermined pressure against the skirt of the cap and with the axis of the roll disposed in downwardly and outwardly inclined position relative to the skirt of the cap to thereby spin the same to the neck portion of the jar with a downward tucking action during rotation of the jar and cap while the roll is free to establish its own vertical position relative to the skirt of the cap, and means for permitting tilting of the table upon contact of the cap with said chuck to compensate for any non-parallel disposition of the sealing surface of the glass jar relative to the bottom surface of the jar.

7. A machine for spinning tin caps to glass jars comprising means for holding a jar with a cap positioned thereon in sealing engagement therewith, means for rotating said holding means, jar and cap as a unit, a seaming roll, means for rotatably supporting the seaming roll adjacent the skirt of the cap, said supporting means including a pivotally mounted leaf spring adapted to flex under a predetermined pressure, means for forcing said spring toward said cap to engage the seaming roll with the skirt of the cap and to flex the spring to dispose the roll in a downwardly and outwardly inclined position with respect to the skirt of the cap to thereby spin the skirt of the cap to the jar under the yielding inward pressure applied by the spring to said roll whereby a downward tucking action is exerted by the roll against the skirt of the cap in view of the inclined position of the roll relative thereto.

8. A container closing machine comprising a rotatable table for supporting a container having a cap loosely placed thereon, a rotatable chuck above said table, means for raising said table and the container supported thereby to bring said cap into firm engagement with said chuck, means for rotating said table, container, cap and chuck as a unit, a plurality of leaf springs movably supported adjacent said chuck, a seaming roll rotatably and vertically slidably mounted on each of said springs for engagement with the skirt of the cap, means for moving the springs inwardly toward said chuck to engage the rolls with the skirt of the cap and to flex the springs to dispose the rolls in downwardly and outwardly inclined position relative to the skirt of the cap, whereby the skirt of the cap is spun to the container under a downwardly directed tucking action thereagainst by said rolls while the rolls are free to move vertically relative to the skirt of the cap to thereby establish their own plane of rotation relative thereto and independently of each other in conformity with any irregularities of the container.

9. A container holder for container closing machines comprising a rotatable table support, a table vertically slidable on said support and rotatable as a unit therewith, and means associated with said table and support for normally rigidly holding the table horizontally disposed relative to said support and for releasing said table for tilting movement about a central fulcrum upon downward pressure exerted upon the same by a container.

10. A container holder for container closing machines comprising a rotatable table supporting sleeve having a radially extending flange, a table vertically slidable on said sleeve including a flange, a piston movably mounted within said sleeve, a ball intermediate said piston and table for tiltably supporting the table thereon, and resilient means for normally holding the piston, ball and table in their uppermost position with the flange of the table in engagement with the flange of the sleeve and the table locked against tilting movement whereby upon depression of the table, ball and piston against the tension of the spring the flange of the table is disengaged from the flange of the sleeve to thereby release the table for free tilting movement thereof.

11. A machine for spinning metal caps to glass jars comprising a sealing head having a sealing chamber, a rotatable chuck in said chamber, means for holding a cap in said chamber adjacent said chuck, a rotatable table for receiving and supporting a glass jar to be closed, means for elevating said table for introducing the neck portion of the glass jar and the said sealing chamber into contact with said cap and for pressing said cap into contact with said chuck, means for rotating said table, jar, cap and chuck as a unit, a seaming roll, means rotatably supporting said roll for free vertical movement relative to the skirt of the cap, means for urging said roll under predetermined pressure and in downwardly and outwardly inclined position against the skirt of the cap to thereby spin the same to the neck portion of the jar with a downward tucking action during the rotation of the jar and cap while the roll is free to establish its own vertical position relative to the skirt of the cap, and means for admitting steam to the sealing chamber upon the introduction of the neck portion of the glass jar into said chamber until the spinning operation of the skirt of the cap to the jar has been completed.

FRANK W. KRUEGER.

REFERENCES CITED

The following references are of record in the file of this patent:

UNITED STATES PATENTS

| Number | Name | Date |
| --- | --- | --- |
| 152,325 | Bocklen et al. | June 23, 1874 |
| 179,218 | Pitt | June 27, 1876 |
| 386,096 | Verdel | July 10, 1888 |
| 826,245 | Hall | July 17, 1906 |
| 1,198,254 | Messerschmidt | Sept. 12, 1916 |
| 1,251,166 | Arnstein | Dec. 25, 1917 |
| 1,452,410 | Boucher | Apr. 17, 1923 |
| 1,541,389 | Potdevin | June 9, 1925 |
| 1,801,062 | White et al. | Apr. 14, 1931 |
| 2,108,932 | Van Segebaden et al. | Feb. 22, 1938 |